United States Patent [19]

Tichtinsky

[11] 4,302,709
[45] Nov. 24, 1981

[54] VIBRATING DEVICE WITH MOTIONLESS FRAME

[75] Inventor: Jean-Claude Tichtinsky, Orsay, France

[73] Assignee: Office National d'Etudes et de Recherche Aerospatiales, Chatillon, France

[21] Appl. No.: 101,740

[22] Filed: Dec. 10, 1979

[30] Foreign Application Priority Data

Dec. 14, 1978 [FR] France .................. 78 35265

[51] Int. Cl.³ ............................................. H01L 41/10
[52] U.S. Cl. ....................................... 318/116; 310/321; 350/6.5
[58] Field of Search ........................ 318/118, 114, 116; 310/321, 323, 326, 330, 331, 335, 348; 350/6.5, 6.6

[56] References Cited

U.S. PATENT DOCUMENTS

| | | | |
|---|---|---|---|
| 3,642,344 | 2/1972 | Corker | 350/6.6 |
| 3,696,259 | 10/1972 | Mori | 310/323 |
| 4,124,829 | 11/1978 | Kuenemund | 310/321 X |
| 4,187,452 | 2/1980 | Knappe et al. | 350/6.6 |
| 4,210,837 | 7/1980 | Vasiliev et al. | 310/323 |

*Primary Examiner*—B. Dobeck
*Attorney, Agent, or Firm*—Abraham A. Saffitz

[57] ABSTRACT

Device for vibrationally deviating an optical beam. It includes a frame, a main mechanical resonator, an auxiliary mechanical resonator and vibration generator means. The main mechanical resonator is formed of an optical member such as a mirror and resilient means connected to the optical member and the vibration generator means impress upon the optical member through the resilient means a rotational or translational motion, the frequency of which is that of the main resonator. The auxiliary resonator is formed of resilient blades having a free end and another end connected to the frame and its resonance frequency of the auxiliary resonator is equal to the resonance frequency of the main resonator. The two resonators vibrate in phase opposition in order that the periodic mechanical stresses applied respectively by the two resonators to the frame have at any instant, one and the same direction and opposite senses.

12 Claims, 4 Drawing Figures

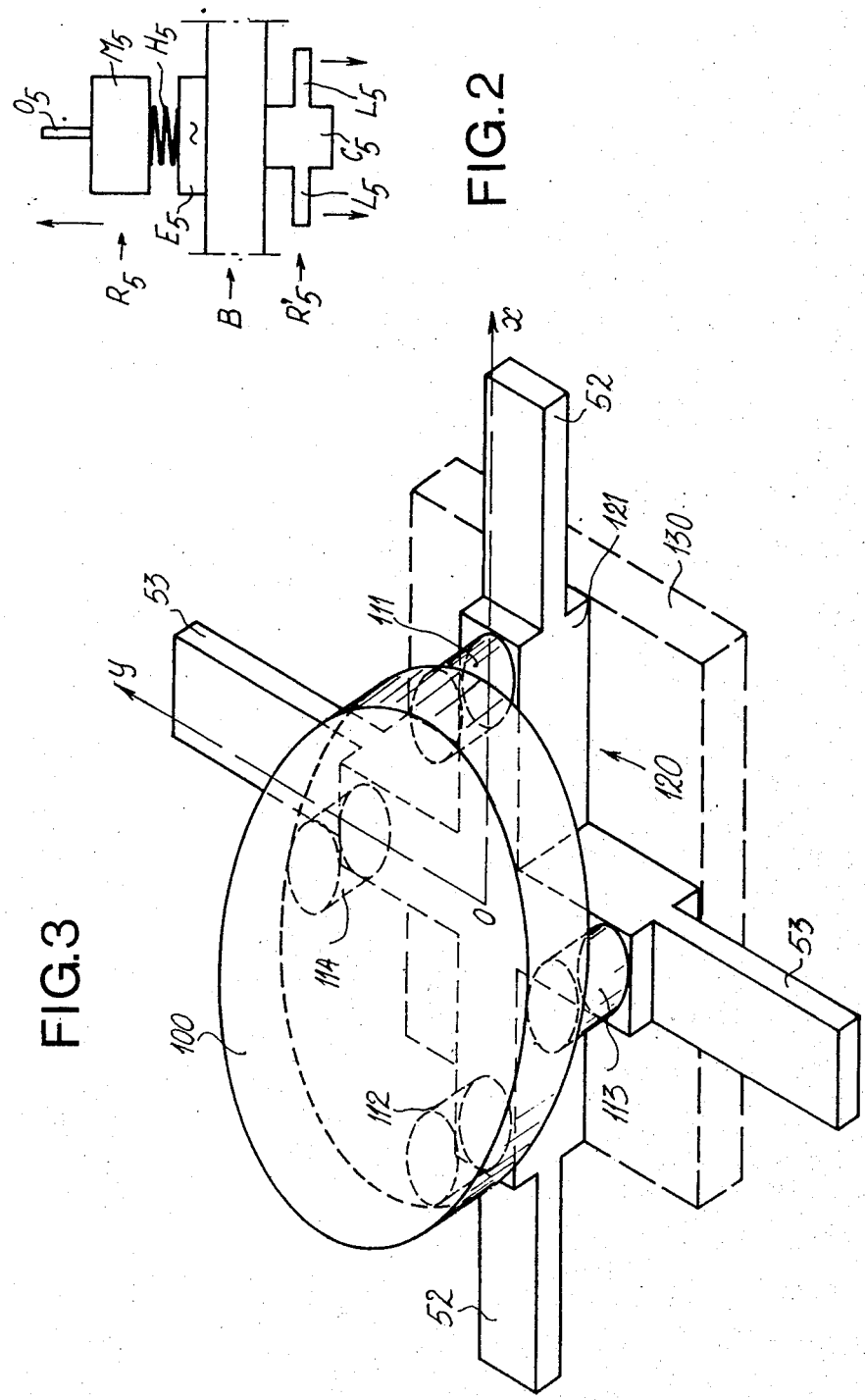

VIBRATING DEVICE WITH MOTIONLESS FRAME

BACKGROUND OF THE INVENTION

1. Field of the Invention

The invention relates to a vibrating device for the processing of an optical beam, that is to say to a device including an optical member and a frame supporting the device and means of impressing upon the optical member a vibratory motien relative to the frame.

By "optical member" is understood here any element intended for imposing upon a beam of electromagnetic energy an optical process such as a reflection, a refraction, a diffraction, a modulation of phase or of amplitude, etc. As examples of optical members which may be subjected to a vibratory motion of rotation or translation relative to the frame of an optical apparatus or an element of an optical bench, may be mentioned the movable gratings or the reflecting mirrors of infrared grating spectrometers, the networks employed in holographic techniques, the models for photoelasticimetry, etc.

The vibratory motion is obtained either by means of a positive mechanical control (including, for example, an electric driving motor and a connection by connecting-rod or by cam), or by means of a mechanical oscillator supporting the optical member and excited at its fundamental resonant frequency. This second solution is generally preferred, especially for reasons of bulk and efficiency.

However a vibrating resonator device connected to a frame excites vibrations in the frame. This disadvantage becomes very disturbing when the apparatus or the bench is intended for tests or measurements which demand a high level of resolution and/or great sensitivity. The solution to the problem which one encounters with such vibrations is to overdimension the frame in order to increase its rigidity and its mass. This is acceptable for apparatus or benches employed at a fixed station but it is not acceptable apparatus mounted in aircraft or satellites, in which the mass of the airborne material must be restricted.

2. Description of the Prior Art

A solution has already been proposed in French Pat. No. 2 116 089, which in certain cases enables the excitation of the frame to be reduced. It consists of a torsion-bar resonator device intended for making a mirror oscillate in rotation, and connecting the ends of the torsion-bar to the frame by means of resilient pivots, that serve as flexible members the stiffness of which is very much less in torsion than the stiffness of the bar. This particular solution is not very satisfactory (especially for an airborne apparatus) because the portion of the frame connected directly to the resonator is subjected to a torque which cannot be neglected and which comes from the reaction of the excitation system. The vibrations transmitted to the frame of the apparatus and to the other members which the frame supports bring about a dissipation of energy which can only be borrowed from the excitation member of the resonator. The factor of resonance Q of the vibrating system becomes altered and this factor depends upon the internal damping of the structure consisting of the apparatus and its support. Now this damping itself varies with the ambient conditions (temperature, pressure, mechanical stresses due especially to inertia in the case of acceleration, variable gravity, etc.). The parameters which characterize the vibratory motion (especially the frequency and the amplitude) are no longer constant.

It has also been proposed to reduce the parasitic vibrations generated on the support of a device endowed with an oscillating motion by providing a frictionless dynamic damper consisting of an oscillating system comprising a mass supported by resilient means judiciously dimensioned and fixed to the support. The parasitic vibrations excite the dynamic damper which oscillates and produces a force of reaction which is at any moment equal and opposite to the disturbing force. The dynamic dampers which are suitable for industrial applications in which a considerable residual level of vibration is accepted, but such industrial dampers do not have a sufficient efficiency to be effective when installed to compensate for vibration optical apparatus.

The invention enables all of these disadvantages in the prior art to be avoided because it provides a novel vibrating device which does not react upon the portion of the frame to which it is connected. More precisely, this device of the present invention includes sensitive and effective compensation means which apply constantly to the said portion of the frame a reaction which cancels out the reaction applied by the resonator.

SUMMARY OF THE INVENTION

The vibrating device for the processing of an optical beam in accordance with the invention includes:
  a first mechanical resonator called the "main resonator" comprising an optical member, resilient means having at least one degree of freedom, and means of connection of the optical member to the said resilient means;
  a frame and means for impressing upon the optical member relative to the frame a resonant vibratory motion having the said degree of freedom and the frequency of which is that of the main resonator;
  a second mechanical resonator called the "auxiliary resonator" coupled and tuned to the natural frequency of the main resonator and having the same degree of freedom of the main resonator;
  means of connection for one of the resonators to a portion of the frame; and
the said device being further characterized in that the auxiliary resonator comprises a set of resilient blades fixed by one of their ends and the other end of the set of blades being free and being dimensioned in order to oscillate at the natural frequency of the main resonator.

In one embodiment of the invention, the auxiliary resonator is directly connected to the said portion of the frame and is connected to the main resonator by means which impart to the optical member the resonent vibratory motion.

In another embodiment in which the mechanical efficiency is improved it is the main resonator which is connected to the frame.

In permanent vibratory operation the coupling of the two resonators by the portion of the frame causes them to vibrate in phase opposition with an amplitude ratio such that the periodical mechanical stresses applied respectively by the two resonators to the portion of the frame have at any moment equal amplitudes, a common direction and opposite senses. Let:
  $I_1$ be the inertia (or dynamic mass) of the main resonator, $K_1$ its stiffness in the degree or degrees of freedom which are assigned to it, $a_1$ the instantaneous value of the (angular and/or linear) displacement of the barycenter of the said resonator and $A_1$ the amplitude of this displacement;

$I_2$ be the inertia of the system formed by the portion of the frame and by the means of connection of the two resonators to this portion of the frame, $K_2$ its stiffness in the same degree or degrees of freedom, $a_2$ the instantaneous value of the displacement of its barycenter and $A_2$ the amplitude of this displacement;

and finally, let $I_3$ be the inertia of the auxiliary resonator, $K_3$ its stiffness in the same degree or degrees of freedom, $a_3$ the instantaneous value of the displacement of its barycenter and $A_3$ the amplitude of this displacement.

In an undamped system, because of the coupling existing between the two resonators through the portion of the frame; the system of the equations of motion is as follows:

$$\left. \begin{array}{l} I_1 (d^2a_1/dt^2) + K_1 (a_1 - a_2) = 0 \\ I_2 (d^2a_2/dt^2) + K_1 (a_2 - a_1) + K_2 (a_2 - a_3) = 0 \\ I_3 (d^2a_3/dt^2) + K_2 (a_1 - a_3) = 0 \end{array} \right\} \quad (1)$$

For any frequency of vibration F the system of the equations of movement is as follows (t being time):

$$\left. \begin{array}{l} a_1 = A_1 \sin 2\pi Ft \\ a_2 = A_2 \sin 2\pi Ft \\ a_3 = A_3 \sin 2\pi Ft \end{array} \right\} \quad (2)$$

If the natural frequency common to the two oscillators is called Fp, let:

$$Fp = 2\pi(K_1/I_1)^{\frac{1}{2}} = 2\pi(K_2/I_2)^{\frac{1}{2}} \quad (3)$$

and one derives from the previous equations the following system of equations:

$$\left. \begin{array}{l} -A_1F^2 + Fp^2 (A_1 - A_2) = 0 \\ -A_3F^2 + Fp^2 (A_3 - A_2) = 0 \\ -I_1A_1 + I_2A_2 + I_3A_3 = 0 \end{array} \right\} \quad (4)$$

This system has amongst others three particular solutions:

$$F = 0, \quad A_1 = A_2 = A_3 \quad (5)$$

$$F = Fp, \quad A_2 = 0 \text{ and } A_1I_1 + A_2I_2 = 0 \quad (6)$$

$$F = Fp \{ 1 + [(I_1 + I_3) / I_2]^{\frac{1}{2}} \} \quad (7)$$

$$A_1 = A_3 \text{ and } A_2 = A_1(I_2 + I_3) / I_2$$

The relationship (5) is of no interest since it corresponds with immobility of the two resonators. The relationships (6) and (7) correspond respectively to the two natural frequencies of the mechanical system.

$F = Fp$, from (6), corresponds with the case where the natural frequency of the assembly is equal to the natural frequency of the two resonators oscillating in phase opposition. It may be seen that the amplitude of the auxiliary resonator remains such that the stress which it exerts upon the portion of the frame cancels at any moment the stress exerted by the main resonator. The portion of the frame is subjected at any moment to strictly antagonistic forces and/or torques and remains perfectly immovable. The oscillatory operation of the system is stable.

$$F = Fp\{1 + [(I_1 + I_3)/I_2]^{\frac{1}{2}}\}$$

from (7), corresponds with the case where the two resonators are in phase. The stresses exerted by them add up at any moment and are balanced by the reactions of the portion of the frame upon which are imposed large movements which are dissipative of energy. The damping coefficient and the Q factor of the mechanical system are respectively much greater and much smaller than in the previous case. They define an unstable operation.

If the system is inserted into an electromechanical oscillatory loop it rapidly acquires and holds the frequency $F = Fp$ which corresponds with stable operation and with almost absolute immobility of the portion of the frame.

The foregoing calculations have been carried out without any hypothesis being made about any one of the following:

the degree or degrees of freedom assigned to the motion of the optical member and consequently to the resonators (rotation and/or translation);

the deformation mode of the resilient means of the resonators (bending, torsion, etc.);

the nature of the means intended to impress the vibratory motion upon the optical member (piezoelectric means, electromagnetic means, etc.);

which of the resonators the vibrations are applied thereon and the region of the said resonator to which they are applied; and the relative position of the two resonators with respect to one another and with respect to the portion of the frame.

BRIEF DESCRIPTION OF THE DRAWINGS

Four embodiments of the present invention are described in more detail by way of examples with reference to the accompanying drawings wherein:

FIG. 2 is a summary diagram of the mechanical portion of a device in accordance with the invention and including a main resonator endowed woth a motion of translation and an auxiliary resonator in accordance with FIG. 1a; and FIG. 3 represents diagrammatically an application of the invention to a system of optical aiming of a laser beam.

DESCRIPTION OF THE PREFERRED EMBODIMENTS

No matter which resonator is the one upon which the vibration generator means act directly, the resonator which supports the optical member which is to be made to vibrate will be called the "main resonator".

Figure 1A:
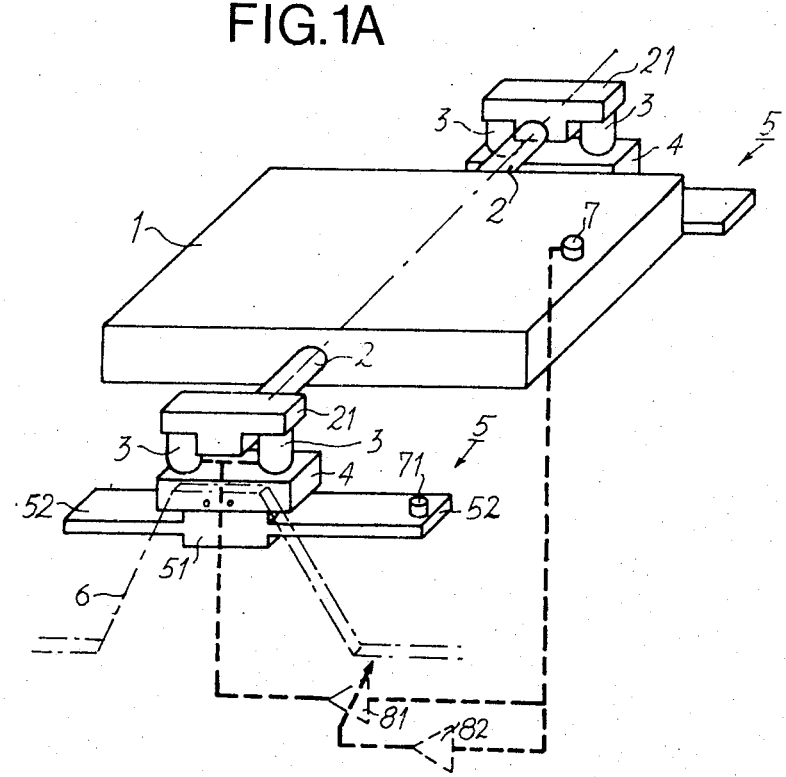
FIG. 1a represents partly in the form of a perspective, partly in the form of a block-diagram, a device in accordance with the invention for endowing a mirror with a rotary oscillatory motion.

First of all, FIG. 1a may be considered. The mirror 1 is fixed by two opposite sides to two torsion-bars 2 which terminate respectively in two bar supports 21. In fact, the attachment is effected by way of a metal frame (nor shown) connected to the torsion-bars, onto which the mirror is glued. The mirror 1, the torsion-bars 2 and the bar supports 21 form the main resonator. Each bar support 21 is fixed to a portion 6 of the frame of the apparatus by way of a vibration generator means consisting of two stacks 3 of piezoelectric discs and blocks 4 fixed to the portion 6 of the frame. The axes of the two stacks 3 interposed between each support 21 and the corresponding seating 4 are parallel to one another and are symmetrically arranged on opposite sides of the geometrical axis of the corresponding torsion-bar 2 in a plane perpendicular to the said axis. The two piezoelectric stacks 3 of one and the same vibration generator means are fed by alternating currents at the natural frequency of the main resonator and in phase opposition thereto through an electronic control loop. The two vibrating generators on both sides of the mirror are fed in phase with each other. With a view to making the system insensitive to variations in temperature, this loop consists essentially of a mirror movement sensor (here an accelerometer 7) fixed to the mirror and of an amplifier 81 the input of which is connected to the output of sensor 7 and the output from which feeds the vibration generator means. The electromechanical system thus formed is self-oscillating and is constantly tuned to the frequency of the main resonator. A gain control loop is represented by an amplifier 82 the input of which is also connected to sensor 7 and the output of which is connected to the gain control input of the amplifier 81. This loop acts upon the gain of the amplifier 81 so that the amplitude of the signal from the sensor 7 remains constant and the amplitude of the motion of vibration of the mirror 1 also remains constant.

In accordance with the invention, an auxiliary mechanical resonator is connected to the portion 6 or the frame. It consists of two vibrating resilient blade members 5 extending respectively from their contact facings 51 onto that face of each block 4 which is opposite from the face supporting the vibration generator means 3. Each member 5 has two flexible blades 52 which extend symmetrically on opposite sides of the common axial plane of the main resonator and of the vibration generator means 3. The four blades 52 are arranged in a plane perpendicular to the said axial plane and are dimensioned so that their frequency of resonance is equal to that of the main resonator. The whole is equivalent to a torsion pendulum having a high Q coefficient and a very weak damping coefficient and this pendulum is kept in oscillation by an infinitesimal movement of the portion of the frame 6.

Figure 1B:
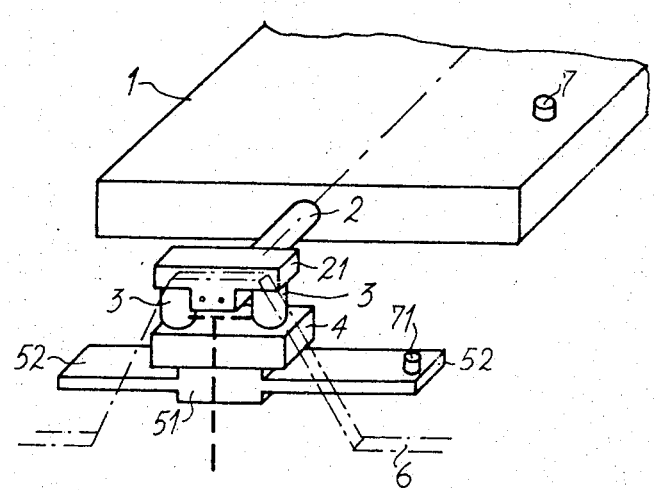
FIG. 1b is a partial view of another embodiment of the invention.

FIG. 1b represents another embodiment of the invention which differs from the embodiment represented in FIG. 1a in that the vibration generator means consisting of the two stacks 3 of piezoelectric discs is inserted between the auxiliary resonator 52 and the portion of the frame 6 instead of being inserted between the main resonator and the said portion of frame. The frame 6 is connected to the bar support 21 instead of being connected to the seating 4. Hence the vibration generator means 3 excites the main resonator indirectly and the auxiliary resonator directly.

The device of the invention as has just been described with reference to FIG. 1a has been employed in a spectrometer having a fixed grating and a vibrating mirror, intended for being airborne on a satellite. The mirror 1 glued was on a mounting of Invar and measures $100 \times 100 \times 30$ mm. The two torsion-bars 2 the diamter of which is 9.3 mm and the length 10 mm are of Z30C13 steel. Each of the two stacks 3 of each vibration generator consists of a stack of five discs of piezoelectric ceramic, the thickness of which is 2 mm and the diameter 14 mm, and the vibration generator is fed with an effective voltage of 1.16 V. The two flexible blades 52 of each of the two elements of the auxiliary resonator 5, of Z30C13 steel, have a length of 63 mm and a cross-sectional area of $2.3 \times 15$ mm. The resonance frequency of the system is 504 Hz, the angular amplitude of the oexillations of the mirror is 6.25 seconds of arc and the Q factor is 560. The latter remains stable independent of the nature of the associated frame. If the auxiliary resonator 5 is omitted it is found that depending upon the mechanical and geometrical characteristics of the associated frame (modulus of elasticity of the material, shapes and dimensions) the resonance frequency varies within limits lying between 508 and 520 Hz and the Q factor between 7.5 and 150. These results amply confirm the advantages of the invention.

The purpose of FIG. 2 is to show that an auxiliary resonator having vibrating blades, such as that in FIG. 1a or 1b may be employed in conjunction with a main resonator driving an optical member in translation instead of driving it in rotation. The main resonator R5 (inertia M5, stiffness R5) which supports the member O5 is excited by the vibration generator means E5. The auxiliary resonator R′5, fixed by its central seating C5 onto the face of the frame B opposite from that which supports the resonator R5, includes resilient blades L5 all of which vibrate in phase opposition to the mass M5.

FIG. 3 shows a device in accordance with the invention for the optical aiming of a laser beam towards a target. This device includes a plane mirror 100 and a device for controlling the vibrations of the mirror which comprises two pairs 111–112 and 113–114 of stacks of piezoelectric discs bonded to the auxiliary resonator 120 and the frame 130. The pairs 111–112 and 113–114 are fed by means of two electrical generators of alternating signals (not shown) at frequencies corresponding with the resonance frequency along the two axes of rotation Ox and Oy of the main resonator. The latter consists of the mirror 100 connected directly to the stacks 111, 112, 113, 114, the resilient drive back of the mirror along the two axes Ox and Oy is effected thanks to the stiffness of the stacks of piezoelectric discs. The auxiliary resonator includes two pairs of flexible blades 52 and 53 which are at right angles to each other and which extend from in a cruciform base 121 and dimensioned in order to resonate under the effect of the vibrations generated by the vibration generator means.

I claim:

1. A vibrating device for processing an optical beam including:
   a main mechanical resonator comprising an optical member receiving said optical beam, resilient means having at least one degree of freedom, and means for connecting said optical member to said resilient means;
   a frame;
   vibration generator means for impressing upon said optical member relative to said frame a resonant vibratory motion having the said degree of freedom, the frequency of which is that of the main resonator;
   an auxiliary mechanical resonator including a set of resilient blades extending on opposite sides of a thick block and dimensioned in order to oscillate at the natural frequency of the main resonator, said auxiliary mechanical resonator having the same degree of freedom as, and vibrating in phase opposition to the main mechanical resonator in order that the periodic mechanical stresses applied respectively by the two resonators to a portion of the frame have at any instant one and the same direction and opposite senses; and means for connecting one of said main and auxiliary resonators to said portion of the frame.

2. A vibrating device as set forth in claim 1; in which the vibration generator means for impressing a resonant vibratory motion upon the optical member is connected to the main resonator and the auxiliary resonator is connected to said portion of the frame.

3. A vibrating device as set forth in claim 1, in which the vibration generator means for impressing the resonant vibratory motion upon the optical member is connected to the auxiliary resonator and the main resonator is connected to said portion of the frame.

4. A vibrating device for processing an optical beam including:
a main mechanical resonator comprising an optical member rotating about a rotation axis and receiving said optical beam, and a torsion bar coaxial with said rotation axis and connected to said optical member;
a frame;
vibration generator means for impressing upon said torsion bar relative to the frame a resonant vibratory rotative motion, the frequency of which is that of the main resonator;
an auxiliary mechanical resonator including a set of resilient blades extending on opposite sides of a thick block and dimensioned in order to oscillate at the natural frequency of the main mechanical resonator, said auxiliary mechanical resonator vibrating in phase opposition to the main mechanical resonator; and
means for connecting one of said main and auxiliary resonators to said frame.

5. A vibrating device as set forth in claim 4, in which the vibration generator means for impressing upon the torsion bar relative to the frame a resonant vibratory rotative motion consists of at least a piezoelectric member having its first end connected to the torsion bar and its second end connected to said frame and the resilient blades are connected to said frame.

6. A vibratory device as set forth in claim 4, in which the vibration generator means for impressing upon the torsion bar relative to the frame a resonant vibratory rotative motion consists of at least a piezoelectric member having its first end connected to the frame and its second end connected to the resilient blades and the end of the torsion bar opposite that connected to the optical member is connected to the frame.

7. A vibrating device for processing an optical beam including:
a main mechanical resonator comprising an optical member receiving said optical beam and spring means connected to said optical member and allowing said optical member to linearly vibrate along a predetermined direction;
a frame;
vibration generator means for impressing upon said spring means relative to the frame a resonant vibratory translation motion along said direction, the frequency of which is that of the main resonator;
an auxiliary mechanical resonator including a set of resilient blades extending on opposite sides of a thick block and dimensioned in order to oscillate at the natural frequency of the main mechanical resonator, said auxiliary mechanical resonator vibrating in phase opposition to the main mechanical resonator; and
means for connecting one of said main and auxiliary resonators to said frame.

8. A vibrating device as set forth in claim 7, in which the vibration generator means for impressing upon the spring means relative to the frame a resonant vibrating translation motion consists of at least a piezoelectric member having its first end connected to the spring means and its second end connected to said frame.

9. A vibrating device as set forth in claim 7, in which the vibration generator means for impressing upon the springs means relative to the frame a resonant vibratory translation motion consists of at least a piezoelectric member having its first end connected to the frame and its second end connected to the resilient blades and the end of the spring means opposite to that connected to the optical member is connected to the frame.

10. A vibrating device for processing an optical beam including:
a main mechanical resonator comprising an optical member receiving said optical beam, resilient means having at least one degree of freedom, and means for connecting said optical member to said resilient means;
a frame;
vibration generator means for impressing upon said optical member relative to the frame a resonant vibratory motion having the samd degree of freedom the frequency of which is that of the main resonator, said vibration generator means comprising a displacement sensor connected to the optical member and producing a control signal, means for amplifying said control signal and means controlled by said amplified control signal for impressing said resonant vibratory motion to said optical member;
an auxiliary mechanical resonator including a set of resilient blades fixed by one of their ends and dimensioned in order to oscillate at the natural frequency of the main resonator, said auxiliary mechanical resonator having the same degree of freedom as, and vibrating in phase opposition to the main mechanical resonator in order that the periodic mechanical stresses applied respectively by the two resonators to a portion of the frame have at any instant one and the same direction and opposite senses; and
means for eonnecting one of said main and auxiliary resonators to said portion of the frame.

11. A vibrating device for processing an optical beam including:
a main mechanical resonator comprising an optical member receiving said optical beam, resilient means having at least one degree of freedom, and means for connecting said optical member to the said resilient means;
a frame;
vibration generator means for impressing upon said optical member relative to the frame a resonant vibratory motion having the said degree of freedom, the frequency of which is that of the main resonator;

an auxiliary mechanical resonator including a set of resilient blades extending on opposite sides of a thick block and dimensioned in order to oscillate at the natural frequency of the main resonator, said auxiliary mechanical resonator having the same degree of freedom as, and vibrating in phase opposition to the main mechanical resonator in order that the periodic mechanical stresses applied respectively by the two resonators to a portion of the frame have at any instant one and the same direction and opposite senses;

a displacement sensor connected to said resilient blades and producing a control signal, means for inverting and amplifying said control signal and means for controlling the vibration generator means by said inverted and amplified control signal; and means for connecting one of said main and auxiliary resonators to said portion of the frame.

12. A vibrating device for processing an optical beam including:

a mirror rotatable about a first and a second orthogonal rotation axes;

a frame;

a first pair of resilient blades aligned along a direction parallel to the first rotation axis, said resilient blades of the first pair extending on opposite sides of a thick block and having free outer ends;

a second pair of resilient blades aligned along a direction parallel to the second rotation axis, said resilient blades of the second pair extending on opposite sides of a thick block and having free outer ends, said first and second pairs of resilient blades forming a first and a second auxiliary resonators;

a first pair of stacks of bonded piezoelectric discs connected on one side to the frame and on the other side to the mirror at the ends of a second diameter parallel to the second rotation axis, said piezoelectric disc stacks forming together with the mirror a first and a second main resonators; and means for feeding the first pair of piezoelectric disc stacks by an alternating current having the common resonance frequency of the first main and auxiliary resonators and the second pair of piezoelectric disc stacks by an alternating current having the common resonance frequency of the second main and auxiliary resonators.

* * * * *